Dec. 17, 1957  L. A. WATSON  2,816,513
PUMP
Filed July 21, 1954  2 Sheets-Sheet 1

INVENTOR.
Louis A. Watson
BY
L. F. Hammand
Atty.

Dec. 17, 1957  L. A. WATSON  2,816,513
PUMP
Filed July 21, 1954  2 Sheets-Sheet 2

INVENTOR.
Louis A. Watson
BY
L. F. Hammond, Atty.

United States Patent Office 2,816,513
Patented Dec. 17, 1957

2,816,513

PUMP

Louis A. Watson, Cedar Falls, Iowa, assignor to Viking Pump Company, Cedar Falls, Iowa, a corporation of Iowa Application July 21, 1954, Serial No. 444,793

2 Claims. (Cl. 103—126)

This invention relates to pumps, and particularly to gear pumps of the internal gear type.

The primary object of the invention is to provide a pump wherein the unique construction and relationship of the individual parts is such that any or all of its working parts may be replaced without removing the pump from its mountings and without disturbing permanent piping attached thereto.

In many pump installations, the pipe connections serving as inlet and outlet for the pump are so designed that it is extremely difficult and time consuming to remove and replace the pipe lines, as would be required to permit installation of a new pump. Also, in many instances, the corrosive nature of fluids being handled cause the threads of the piping system to "freeze" to such an extent that any efforts to uncouple the pipe lines will damage or destroy them. In short, there are many instances in which it is quite impractical to remove the piping associated with a given pump, unless entirely new piping is to be installed.

It is therefore highly desirable to provide a pump of such design that the pump housing, when once installed, need never again be removed or disconnected from permanent inlet and outlet pipe lines attached thereto. This is accomplished by the present invention.

A preferred embodiment of the invention is shown in the drawings of this specification, wherein.

Figure 3:
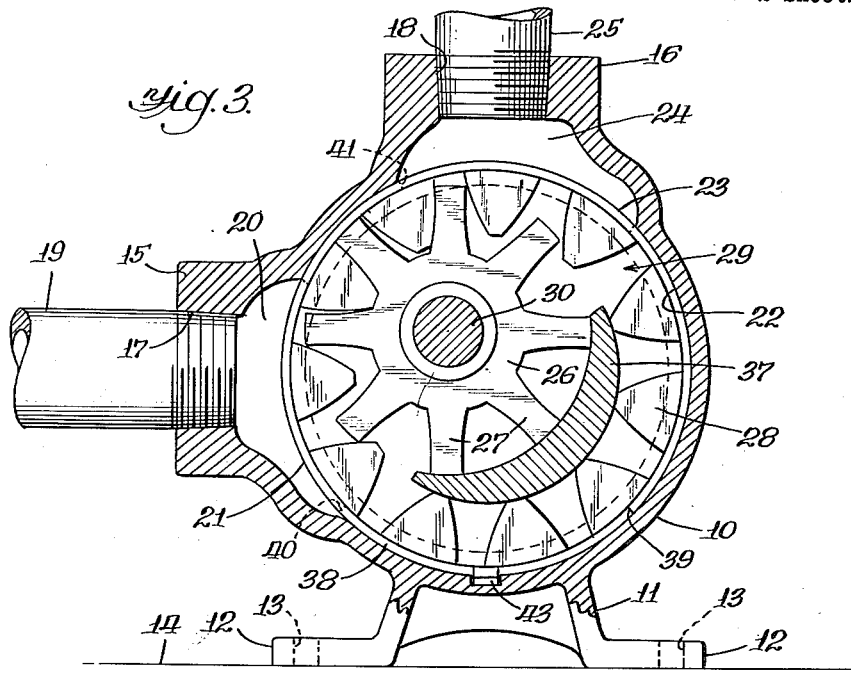
Figure 3 is a vertical sectional view taken substantially on the plane of the line 3—3 of Figure 2.

The main frame of the pump consists of a somewhat circular housing 10, having an integral mounting base or pedestal 11 which may include flanges 12 with bolt holes 13 whereby the pump may be permanently secured on a mounting surface 14. The housing 10 also includes a pair of integral bosses 15 and 16, with threaded inlet and outlet openings. It will be understood, of course, that the operation of the pump is reversible, so that the inlet and outlet may be interchangeable, but for convenience the parts may be referred to as inlet 17 and outlet 18, as is the case when the internal elements of the pump are driven in a counterclockwise direction (Figure 3).

The inlet 17 receives the threaded end of an intake pipe line 19, which discharges into a passage 20 leading to an inlet port 21 formed on the cylindrical inner surface 22 of the fluid cavity of the pump housing. An outlet port 23 spaced from the port 21 has a passage 24 leading to the discharge pipe line 25 threaded into the outlet 18 of the pump.

The rotors utilized in the pump may be of conventional configuration. As illustrated, they include an eccentric inner gear 26 having teeth 27 adapted to mesh with the teeth 28 of an outer gear 29. The inner gear 26 is an idler, and is mounted for free rotation on a short stud 30 affixed in a boss 31 carried by an end plate 32 secured to the pump housing. The end plate 32 also serves to close the forward end of the fluid cavity of the housing. It is removably held in position by a plurality of machine screws 33 and a gasket 34 is preferably provided to effect an adequate, fluid-tight seal.

The outer gear 29 of the pump is of the so-called cage type, mounted concentrically with the wall 22 of the fluid cavity. The gear 29 includes a plurality of separate teeth 28 projecting outwardly from a circular end disc having a central hub 35 keyed to the inner end of a drive shaft 36. These teeth 28 of the outer gear mesh with and drive the teeth 27 of the eccentric inner gear, and a crescent shaped partition 37 is disposed between them, in the usual manner. The crescent may conveniently be formed as an internal projection on the end plate 32.

Figure 1:
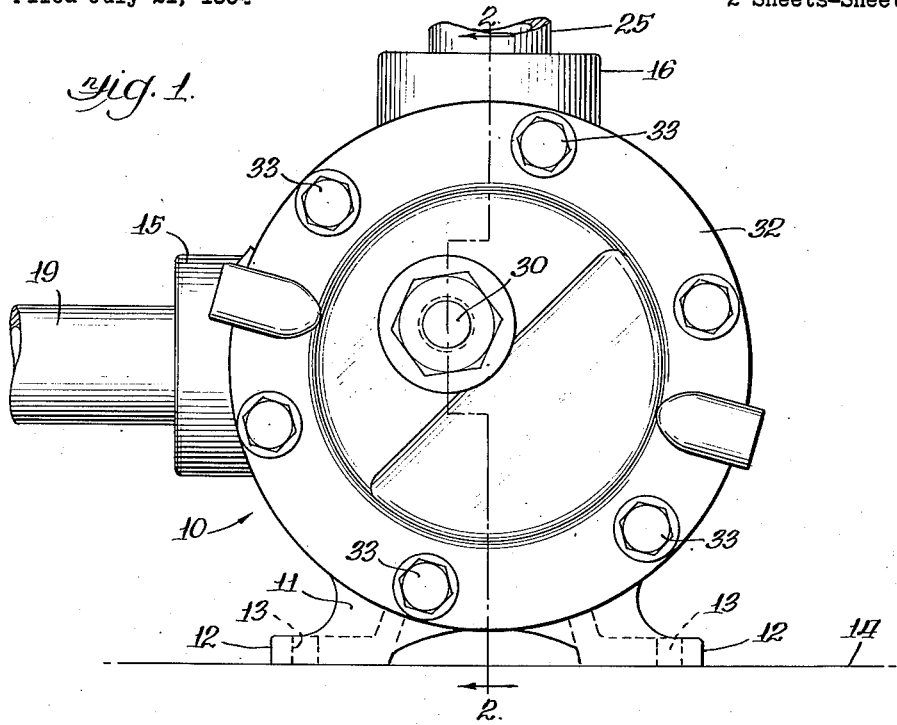
Figure 1 is a front elevational view of a pump constructed in accordance with the inventive concept disclosed herein.
Figure 2:
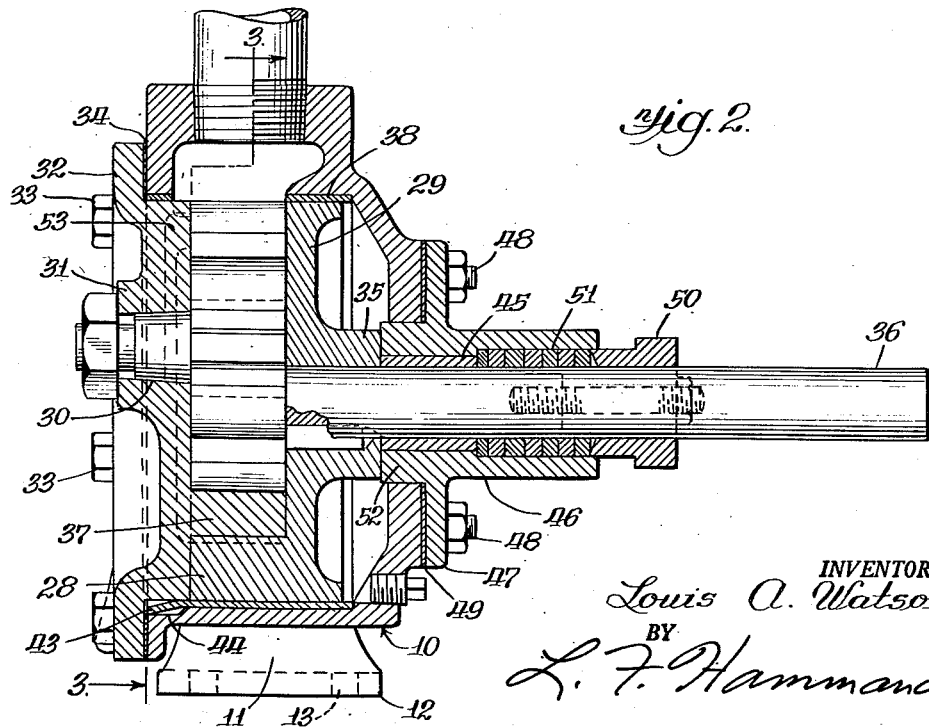
Figure 2 is a vertical sectional view through the pump, the view being taken substantially on the plane of the line 2—2 of Figure 1.
Figure 4:
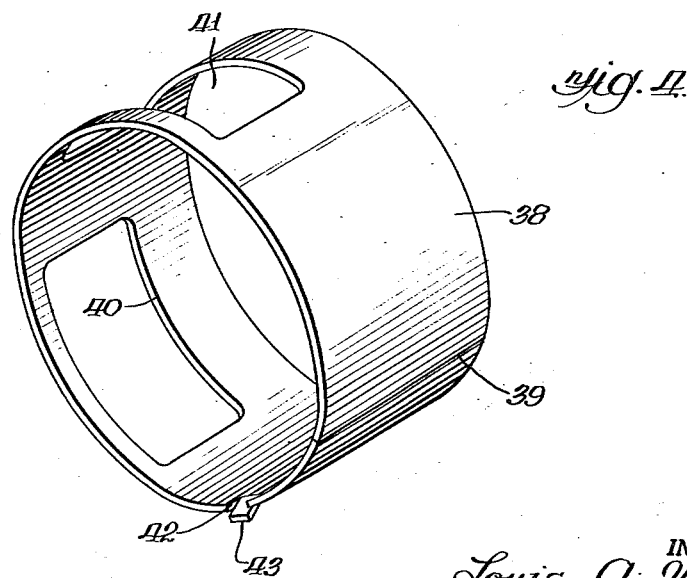
Figure 4 is a detail perspective view of a unique metallic lining sleeve comprising one of the features of the invention.

A resilient metal lining sleeve 38 is disposed in the space between the outer periphery of the gear 29 and the inner walls 22 of the fluid cavity. This lining sleeve, best illustrated in Figure 4, consists of a relatively long, narrow, metallic strip or plate of width corresponding to the depth of the fluid cavity of the pump, and of a length equal to the circumference of the wall 22 of the fluid cavity. The strip is coiled upon itself so that its opposite ends meet in end-to-end abutting relationship along the parting line indicated at 39 (Figure 4). As shown, the sleeve is also provided with an inlet aperture 40 and an outlet aperture 41 of suitable size and shape to register with the inlet port 21 and outlet port 23, respectively. One edge of the sleeve is also preferably split as at 42 so that a small tab 43 may be bent outwardly therefrom. Thus, the sleeve 38 may be fitted within the fluid cavity of the pump to lie closely against the cylindrical walls 22 and function as a liner for the fluid chamber. The tab 43 is received in a notched portion 44 of the chamber (Figure 2) so that the sleeve is held in proper position with the apertures 40 and 41 in precise registry with the inlet and outlet ports 21 and 23, and the interlocking engagement of the tab 43 and its recess 44 also obviously prevents rotation of the sleeve with respect to the pump housing.

As heretofore stated, the inner gear 26 serves as an idler, while the outer gear 29 is positively driven by the rotary drive shaft 36. The drive shaft 36 extends through and is journaled in a main bearing 45 mounted in a hub portion 46 of a removable end plate 47 secured to the pump housing by a plurality of machine screws 48. A gasket 49 may be utilized to effect a seal between the end plate and the pump housing, and a gland 50 and packing 51 may be provided to seal the pump against leakage around the drive shaft. A pilot portion 52 of the end plate serves to center it with respect to the housing 10, and since the outer gear 29 is circular on its peripheral surface and of only slightly smaller diameter than the walls 22 of the fluid cavity, the outer peripheral surfaces of the outer gear 29 may be fitted closely within the arcuate or cylindrical surfaces of the liner 38. A circular pilot portion 53 on the end plate 32 fits closely within the other end of the lining sleeve. Thus the sleeve 38 is locked in position and held expanded, with its ends held in perfect end-to-end alignment.

It will be apparent from the foregoing that the pump assembly here illustrated is so designed that every working part subject to wear may be removed and replaced without loosening the pump housing from its mountings, and without loosening, detaching or otherwise disturbing either the inlet or discharge pipe lines. Moreover, this replacement of parts may be accomplished without need for presses or other special tools usually required for such work. The end plates 32 and 47 may be removed with a conventional wrench. Removal of the end plate 32 permits replacement of the idler gear 26 and its mounting stud 30, as well as replacement of the elliptical segment 37. Removal of the opposite end plate 47 similarly permits substitution of a new end plate and main bearing 45, and obviously permits replacement of the drive shaft 36 and the outer gear 29. Since the lining sleeve 38 is split along the line 39, its ends may be easily snapped out of alignment (after the end plate 32 and gear 29 are removed) and the strip forming the sleeve may then be "peeled" out of the cylindrical cavity of the pump. Replacement of the sleeve 38 provides a completely new internal working surface on the fluid cavity of the pump, and as heretofore noted, its replacement may be accomplished without the need of any press or similar equipment ordinarily required for such operations, since the split construction of the sleeve also permits a new sleeve to be conveniently snapped into place. Once in place the continuous contact with peripheral surface of the gear 29 at one end and the circular pilot portion 52 at the other end is effective to hold the opposite ends of the plate in precise end-to-end alignment with each other after re-assembly. Obviously, this also maintains the interlocking relationship between the tab 43 and its recess 44, and prevents unwanted slippage or rotary movement between the sleeve 38 and the housing, as well as serving to maintain the apertures 40 and 41 of the sleeve in correct registry with the inlet and outlet ports of the housing.

It follows that when any or all of the working parts of the pump are worn out or become corroded, broken or otherwise unserviceable, repairs may be made in such a manner as to provide a completely renewed pump, yet without the need of detaching the piping associated therewith, and consequently, with a minimum interruption of operation of the equipment with which the pump is used.

Having thus described my invention, what I claim as new and desire to secure by United States Letters Patent is:

1. In a pump, a main frame consisting of a housing having a mounting base and including a fixed inlet and a fixed outlet integral with said housing and adapted to receive pipe connections; a cylindrical fluid cavity in said housing with an inlet and an outlet port spaced apart from each other on the outer cylindrical walls of the cavity and passages leading from said ports to said inlet and outlet; a pair of coacting pump rotors within said fluid cavity including an inner gear eccentrically mounted within the cavity and an outer gear concentric therewith; said outer and inner gears each having a series of spaced apart teeth in meshing engagement with each other, with the peripheral surfaces of the outer gear closely adjacent but spaced from the cylindrical walls of the fluid cavity; in combination with a renewable lining sleeve consisting of a metallic plate of uniform thickness throughout and of length equal to the circumference of the fluid cavity, curved upon itself with its ends in end-to-end abutting relation with each other; said sleeve being stationarily mounted within the cylindrical walls of the cavity, with its outer face in surface contact with the walls of the cavity and its inner face in closely fitting sliding contact with the peripheral surfaces of the outer gear; with inlet and outlet apertures through said sleeve in registry with the inlet and outlet ports of said cavity, and a locking and locating tab on said sleeve projecting therefrom into a recess in the pump housing to prevent rotation of the sleeve in the housing; with an end plate on one end of the housing supported solely on said housing and bodily removable therefrom, said end plate including a circular pilot portion fitted within one end of the lining sleeve and a fixed stud wholly supported on said end plate and extending inwardly from said pilot portion to support the eccentric gear of the pump, and a removable end plate on the other end of the housing including a bearing for a rotatable drive shaft carrying the concentric gear of the pump.

2. In a pump, a main frame consisting of a housing having a mounting base and including a fixed inlet and a fixed outlet integral with said housing and adapted to receive pipe connections; a cylindrical fluid cavity in said housing with an inlet and an outlet port spaced apart from each other on the outer cylindrical walls of the cavity and passages leading from said ports to said inlet and outlet; a pair of coacting pump rotors within said fluid cavity including an inner gear eccentrically mounted within the cavity and an outer gear concentric therewith; said outer and inner gears each having a series of spaced apart teeth in meshing engagement with each other, with the peripheral surfaces of the outer gear closely adjacent but spaced from the cylindrical walls of the fluid cavity; in combination with a renewable lining sleeve consisting of a metallic plate of uniform thickness throughout and of length equal to the circumference of the fluid cavity, curved upon itself with its ends in end-to-end abutting relation with each other; said sleeve being stationarily mounted within the cylindrical walls of the cavity with its outer face in surface contact with the walls of the cavity and its inner face in closely fitting sliding contact with the peripheral surfaces of the outer gear; with an end plate on one end of the housing supported solely on said housing and bodily removable therefrom, said end plate including a fixed stud wholly supported on said end plate and extending inwardly therefrom to provide a mounting for one of the gears of the pump, and a removable end plate on the other end of the housing including a bearing for a rotatable drive shaft carrying the other gear of the pump.

References Cited in the file of this patent

UNITED STATES PATENTS

| Re. 5,440 | Lafferty | June 10, 1873 |
| 661,061 | Lidback | Nov. 6, 1900 |
| 926,966 | Shirley | July 6, 1909 |
| 1,660,300 | McGee et al. | Feb. 21, 1928 |
| 1,739,139 | Haight | Dec. 10, 1929 |
| 1,816,508 | Wilsey | July 28, 1931 |